United States Patent
Selvog

(10) Patent No.: US 6,380,743 B1
(45) Date of Patent: Apr. 30, 2002

(54) FLEXIBLE TRACEABLE PUSH ROD

(76) Inventor: John Herbert Selvog, 10725 Woodwatch Cir., Eden Prairie, MN (US) 55347

( * ) Notice: Subject to any disclaimer, the term of this patent is extended or adjusted under 35 U.S.C. 154(b) by 0 days.

(21) Appl. No.: 09/609,344

(22) Filed: Jul. 5, 2000

(51) Int. Cl.[7] .................................................. G01V 3/30
(52) U.S. Cl. ........................................ 324/326; 324/67
(58) Field of Search .......................... 324/67, 326, 232, 324/207.22, 207.17, 207.24

(56) References Cited

U.S. PATENT DOCUMENTS

| | | | |
|---|---|---|---|
| 3,975,735 A | * 8/1976 | McCullough et al. | ....... 324/326 |
| 5,151,657 A | 9/1992 | Tashjian | ..................... 324/326 |
| 5,530,357 A | 6/1996 | Cosman et al. | ............. 324/326 |

* cited by examiner

Primary Examiner—Walter Snow

(74) Attorney, Agent, or Firm—Vidas, Arrett & SteinkrausPA

(57) ABSTRACT

A traceable push rod having a predetermined length comprising an inner layer, an intermediate layer and an outer layer. The inner layer characterized as being electrically conductive. The inner layer preferably made of copper or copper alloy. The intermediate layer characterized as being electrically insulative. The intermediate layer preferably at least partially made of fiber glass. The third layer characterized as being water proof. The third layer preferably made of plastic. The traceable push rod further having a first end and a second end. The first end having at least one sonde receiving terminal for removably receiving a sonde. The second end adapted for electrical communication with an electrical power source such as a battery or transmitter. The electrical power source adapted to provide an electric current to the inner layer and/or the sonde. The inner layer exhibiting a detectable radially emitted electromagnetic signature when exposed to the electric current, the sonde emitting a signal having a predetermined frequency different than the electromagnetic signature when exposed to the electric current.

24 Claims, 5 Drawing Sheets

FLEXIBLE TRACEABLE PUSH ROD

CROSS-REFERENCE TO RELATED APPLICATIONS

Not Applicable

STATEMENT REGARDING FEDERALLY SPONSORED RESEARCH

Not Applicable

BACKGROUND OF THE INVENTION

1. Field of Invention

This invention relates to a traceable push rod and assembly for use in tracing an underground conduit and pinpointing a predetermined location within an underground pipe. Particularly, the present invention is directed to a push rod having a protective low friction coating, internal conductive wiring and a fiberglass core. The push rod may utilize a sonde transmitter for pinpointing a desired location of a pipe or conduit and the entire rod length may be simultaneously energized in order to also provide for the ability to trace the path of the conduit. The push rod may be easily stored and transported with a unique push rod storage holder further described herein.

2. Description of the Prior Art

Methods of locating underground pipe and pinpointing locations within pipe are known in the art. For instance, conductive push rods which may be inserted into an underground conduit or pipe are known. One such prior art push rod is known and sold by Radiodetection Ltd. located in Bristol, United Kingdom under the trade name FlexiTrace. The FlexiTrace brand push rod includes an integral sonde attached at one end of the push rod. The FlexiTrace push rod may be completely energized to allow a signal to be traced along the entire length of the rod, or only the sonde may be energized. The FlexiTrace rod is not capable of energizing the rod while simultaneously energizing a sonde, and in either application the range is limited to approximate detection distance of 10 feet.

It is known to those in the art that situations occur wherein it is necessary to trace a conduit and pin point a given area of the conduit. A push rod capable of providing conduit tracing and pinpointing functions simultaneously would avoid repeatedly having to insert and retract the push rod in order to accomplish both tasks. In addition a push rod which is capable of transmitting trace and pinpointing signals which may be detected at a greater range than prior push rods is also desirable. The present invention provides a push rod capable of completing tracing and pinpointing functions alternatively or simultaneously at greater ranges than the prior art. The unique features of the present invention save time spent at a job site and significantly reduces equipment wear.

BRIEF SUMMARY OF THE INVENTION

The present invention provides for a push rod which employs an efficient electrical design, employing a single or multiple conductors and a single terminal which allows the entire length of the push rod to be energized simultaneously with an associated mini-transmitter or sonde. When energized the push rod and sonde will respectively emit different types of detectable signals which may be detected and differentiated from one another at all ranges, including those in excess of 50 feet. In at least one embodiment of the invention, the energized push rod produces a detectable magnetic field or signal, the sonde preferably produces an acoustic signal having a predetermined frequency. By providing the present invention with two unique detectable signals allows the energized sonde to be used for pinpointing a specific location in the conduit and the energized rod portion to be used for conduit tracing simultaneously.

In addition, the present invention employs a push rod carrier which provides for a convenient way to store, transport and dispense the push rod. The push rod carrier typically will include a rotating spool and a braking system which allows the spool to be locked to prevent further rotation once a predetermined length of the push rod has been dispensed.

BRIEF DESCRIPTION OF THE SEVERAL VIEWS OF THE DRAWINGS

A detailed description of the invention is hereafter described with specific reference being made to the drawings in which.

DETAILED DESCRIPTION OF THE INVENTION

Figure 1:
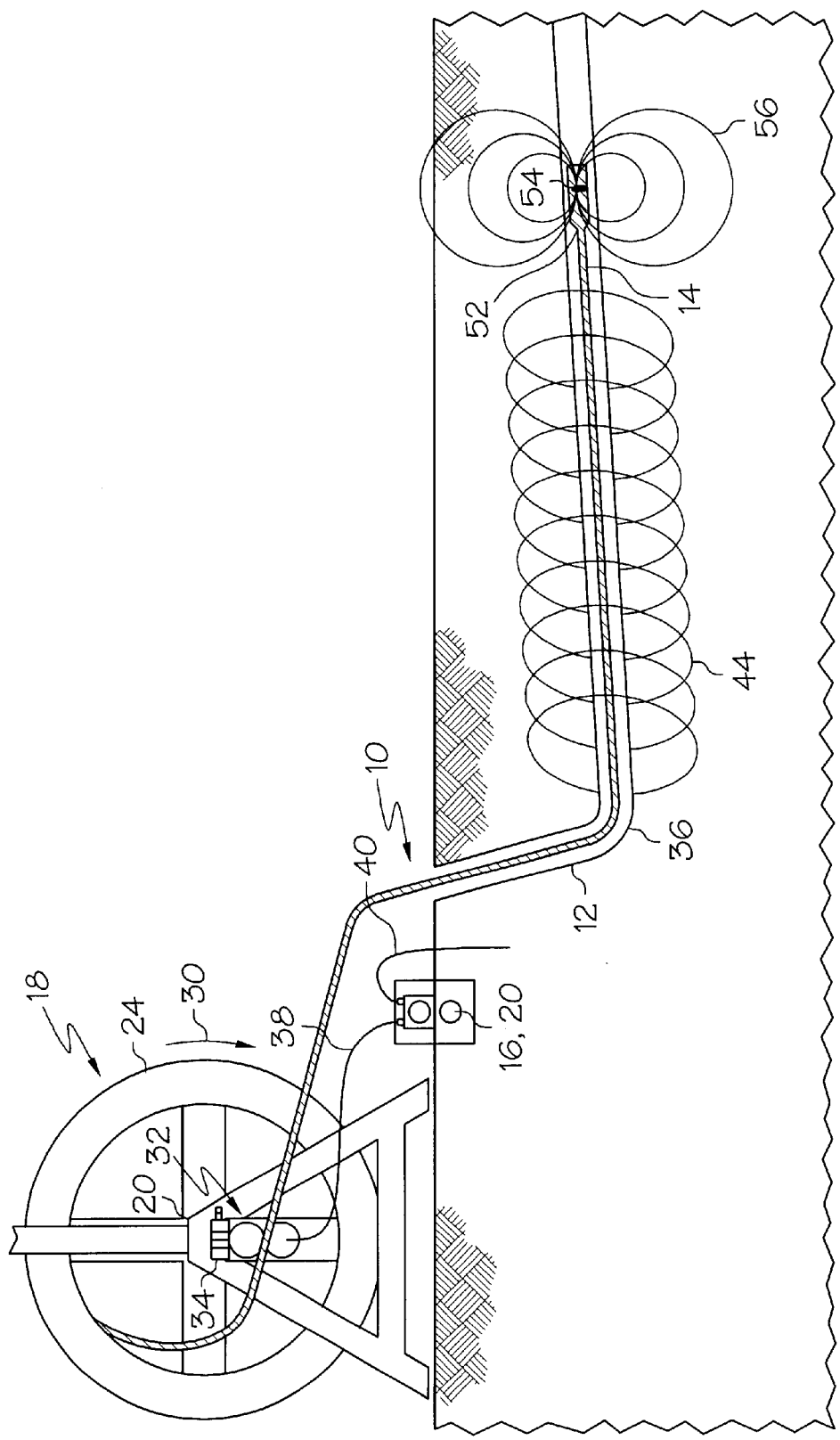
FIG. 1 is a side view illustration of the inventive push rod as it may appear in use with a push rod carrier and a pin pointing sonde.

With reference now to the figures, and in particular with reference to FIG. 1, there is depicted one embodiment of the push rod, of the present invention. The push rod, indicated generally at 10, is illustrated as it might appear when utilized in the field for conduit tracing and pinpointing procedures. In practice, a predetermined length of the push rod 10 is guided into a conduit or pipe 12 and then fed from a unique push rod carrier 18. A portion of the push rod 10 is in electronic communication with the carrier 18. Where the push rod 10 is energized electrically, the carrier 18 is in communication with a power source such as a battery or electric terminal 16. The inventive push rod 10 may be configured to utilize a power source 16 which may emit a current which is alternating current or direct current, and which may utilize a variety of voltages. Preferably, the push rod 10 is constructed and arranged to be energized with a 12 volt direct current. Where the push rod 10 is energized with a signal having a predetermined frequency such as supplied by transmitter 20. In yet another embodiment, the push rod 10 may be directly connected to the power source 16 or transmitter 20 without the carrier 18 being required.

Where the push rod 10 is utilized with the carrier 18, the carrier may comprise a frame 22 and an axially mounted cradle 24. The carrier 18 may also be equipped with an optional handle 26 as shown. To feed out the push rod 10 from the carrier 18, the cradle 24 is rotated in a first direction, indicated by arrow 28. To retract the push rod 10 the cradle 24 is rotated in a second direction, indicated by arrow 30. However, it should be noted that the present push rod 10 has sufficient mass and flexibility characteristics that rotation of the cradle 24 alone may not result in the push rod 10 being feed out. The physical characteristics of the push rod 10 are such that the push rod 10 may require additional manipulation, such as manually pulling the initial portion of the rod off of the cradle 24.

The cradle 24 may be rotated by hand or may be power assisted. To facilitate effortless feed-out and retraction of the push rod 10, carrier 18 may be equipped with a reversible motor 32 or other drive device which could be used to automatically rotate the cradle 24 in the direction desired.

The push rod carrier may be equipped with a counter 34 which provides a user with a display indicating the length of the push rod fed out as cradle 24 rotates.

As may be seen best in FIG. 1, the push rod 10 has sufficient rigidity to be pushed along the path of the pipe. The push rod is also characterized as having sufficient flexibility to allow the push rod to traverse bends and even abrupt path changes such may be encountered at elbow connections such as that indicated by reference numeral 36.

Once the free end 14 of the push rod 10 has been inserted into the conduit or pipe 12 a desired distance, the push rod may be energized via the battery or terminal 16 or the transmitter 20. As previously stated, the entire length of the push rod may be energized.

Typically, push rod 10 may be in electrical communication with carrier 18 via a first lead 38. Depending on the specific power source, a second lead 40 may run from the carrier 18, the terminal 16 or transmitter 20, and is grounded out.

In a preferred embodiment of the invention the push rod 10 is utilized in metal conduits 12 or a conduit which has an electrically conductive fluid (i.e. water) 13 therein or in which such fluid 13 is inserted while the push rod 10 is in use. The fluid 13 or metallic aspect of the conduit 12 allows the transmitted signal or electric current of the push rod 10 with a circuit path to return to ground, thus providing the push rod with a complete electric circuit when the core 42 is energized via the first lead 38. Such a configuration allows the push rod 10 to be capable of emitting a signal over a nearly unlimited range.

Figure 2:
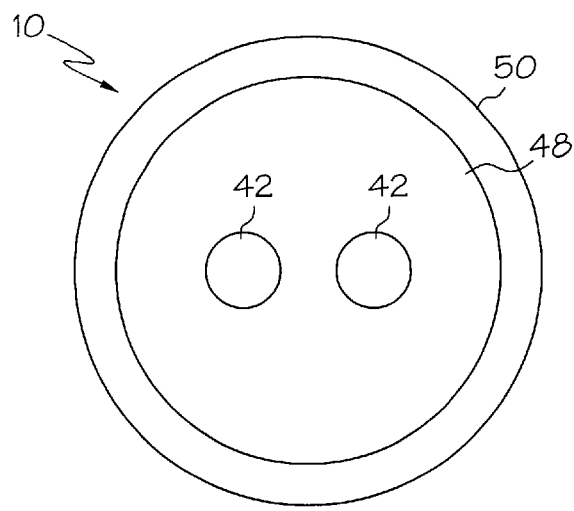
FIG. 2 is a cross-sectional view of an embodiment of the push rod.
Figure 3:
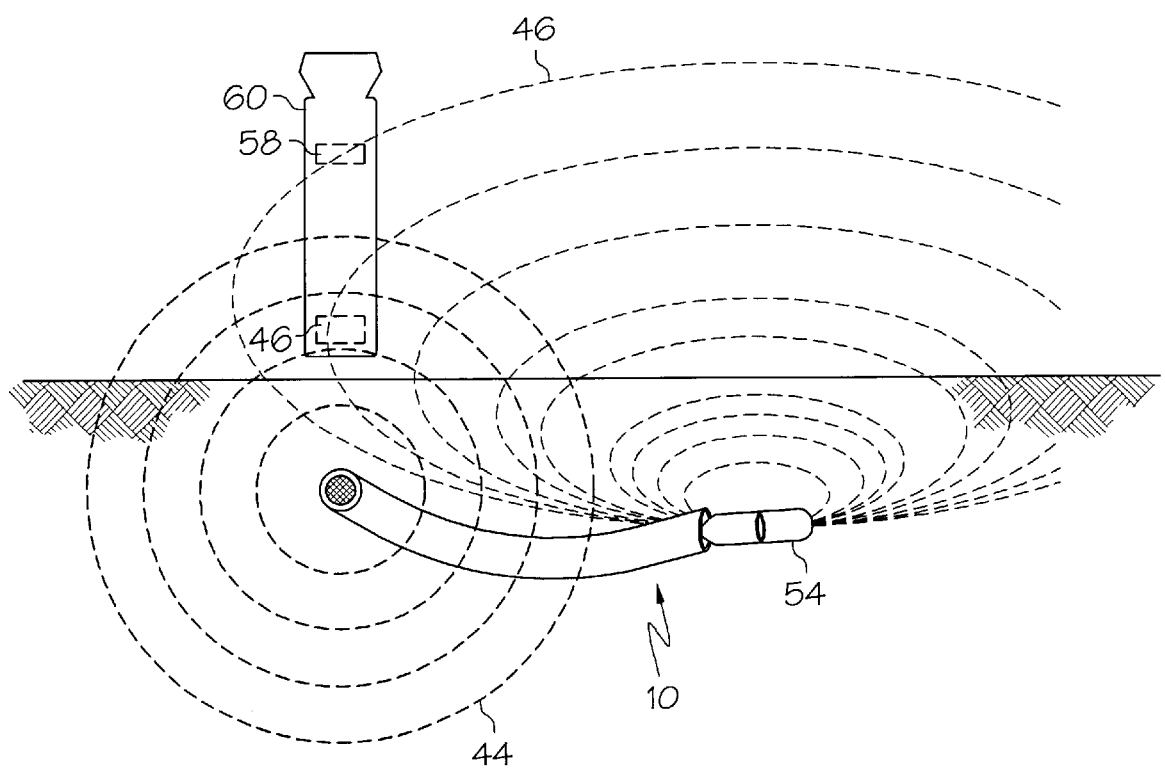
FIG. 3 is a cross-sectional and side view of the push rod and the combination detector, also illustrated are the different signals emitted from the push rod and sonde.
Figure 4:
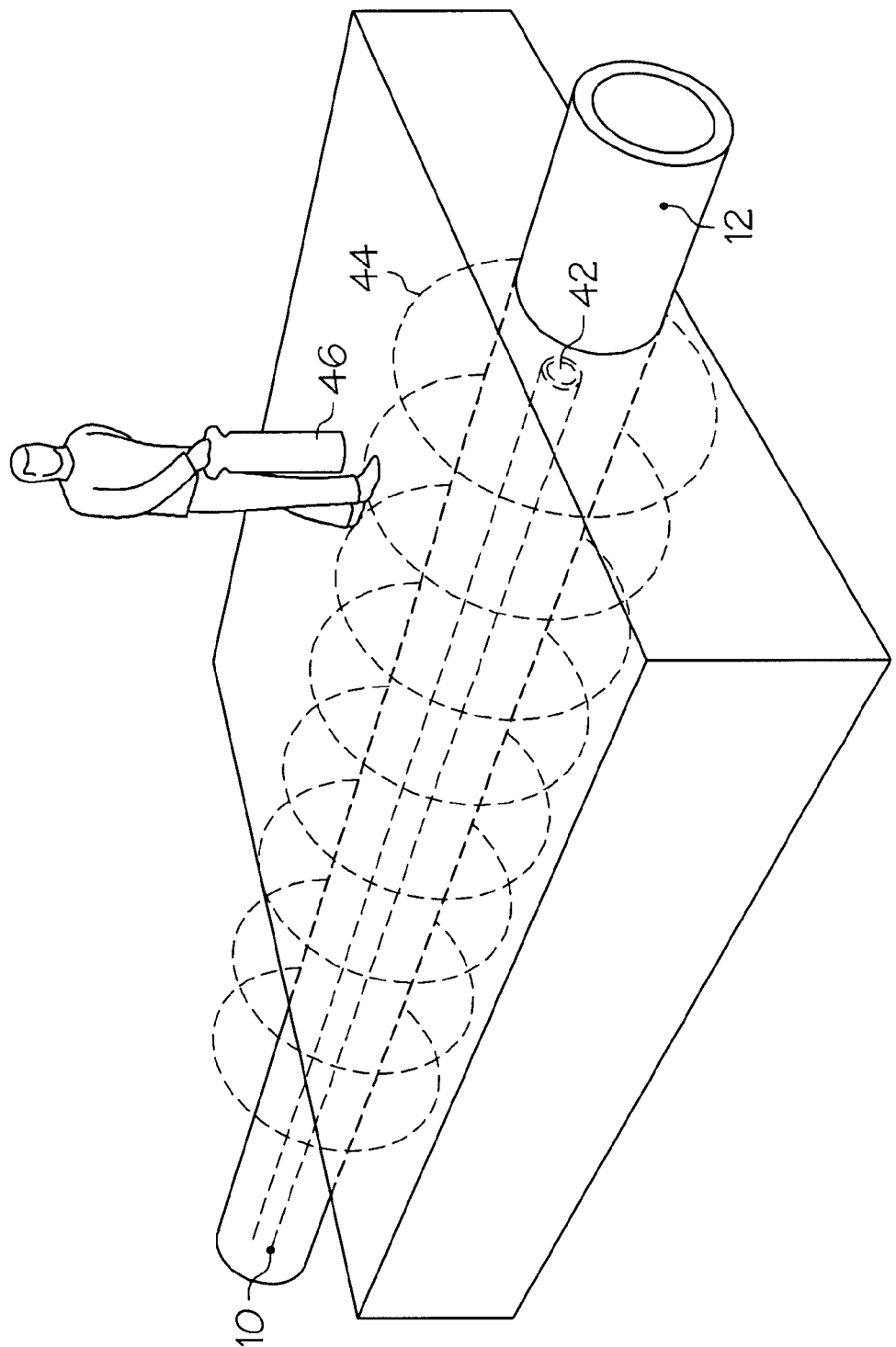
FIG. 4 is a perspective view of the energized push rod in use, as well as a graphical representation of the signal emitted from the push rod.

As may be seen in FIG. 2, the push rod 10 preferably has a multi-layered construction. The inner portion, wire or core 42 of the push rod 10 will typically be constructed of copper or some other conductive material such as: steel, iron, silver gold, aluminum or any alloys thereof. As may be seen the push rod 10 may have multiple core wires 42 to provide for redundancy in case one or more of the wires break 42, however, only one wire 42 is required. When the battery 16 or transmitter 20 is connected directly or indirectly (via the carrier 18 and/or lead 38) to the push rod 10, an electrical current conductively travels the entire length of the core wire 42, causing the length of the entire push rod to exhibit a radial electromagnetic field or signature such as is illustrated by lines 44 as may be seen in FIGS. 1, 3 and 4. The electromagnetic signature of the electrified core wire 42 may be detected by any conventional pipe/cable locator or detector 46 such as depicted in FIG. 4.

In use the power source 16 or transmitter 20 is used to energize the core 42. The energized core 42 will then emit a signal corresponding to the signal supplied by the power source 16 or transmitter 20, thus providing push rod 10 with a unique frequency which is distinct from the natural electromagnetic signature(s) of surrounding metallic objects which may include wires, cables, pipes, mineral deposits, etc. By providing the push rod 10 with a unique electromagnetic signature 44, push rod 10 may be readily detected even when surrounded with a variety of metallic objects which might otherwise interfere or mask the push rod's magnetic signature 44.

Turning back to FIG. 1, surrounding the core 42 is a fiberglass housing 48. Fiber glass housing 48 insulates and protects core 42. Finally, push rod 10 has a protective outer layer 50. The outer layer 50 is preferably a water proof plastic coating characterized as being able to withstand the conditions of hostile underground environments which may result in submerging the push rod in water and sewage waste, abrading the push rod against broken pipes, and exposure of the push rod to chemicals such as entrapped hydrocarbons.

As previously stated, it is often desirable to utilize push rod 10 for conduit tracing procedures as well as for pin pointing. Where it is desired to use the push rod 10 for pin pointing, the free end 14 of push rod 10 may include a mounting region or terminal 52 for mounting a mini-transmitter or sonde 54 mounted thereon. The sonde 54, via terminal 52, may be in electrical communication with core 42 of push rod 10 and may therefore be energized as a result of the conductive nature of core 42 when push rod 10 is electrically energized. Alternatively, the sonde 54 may include an individual power source such as a battery which may be used to energize the sonde 54 and continually transmit a signal continuously during rod insertion regardless as to whether or not the push rod 10 is energized.

Figure 5:
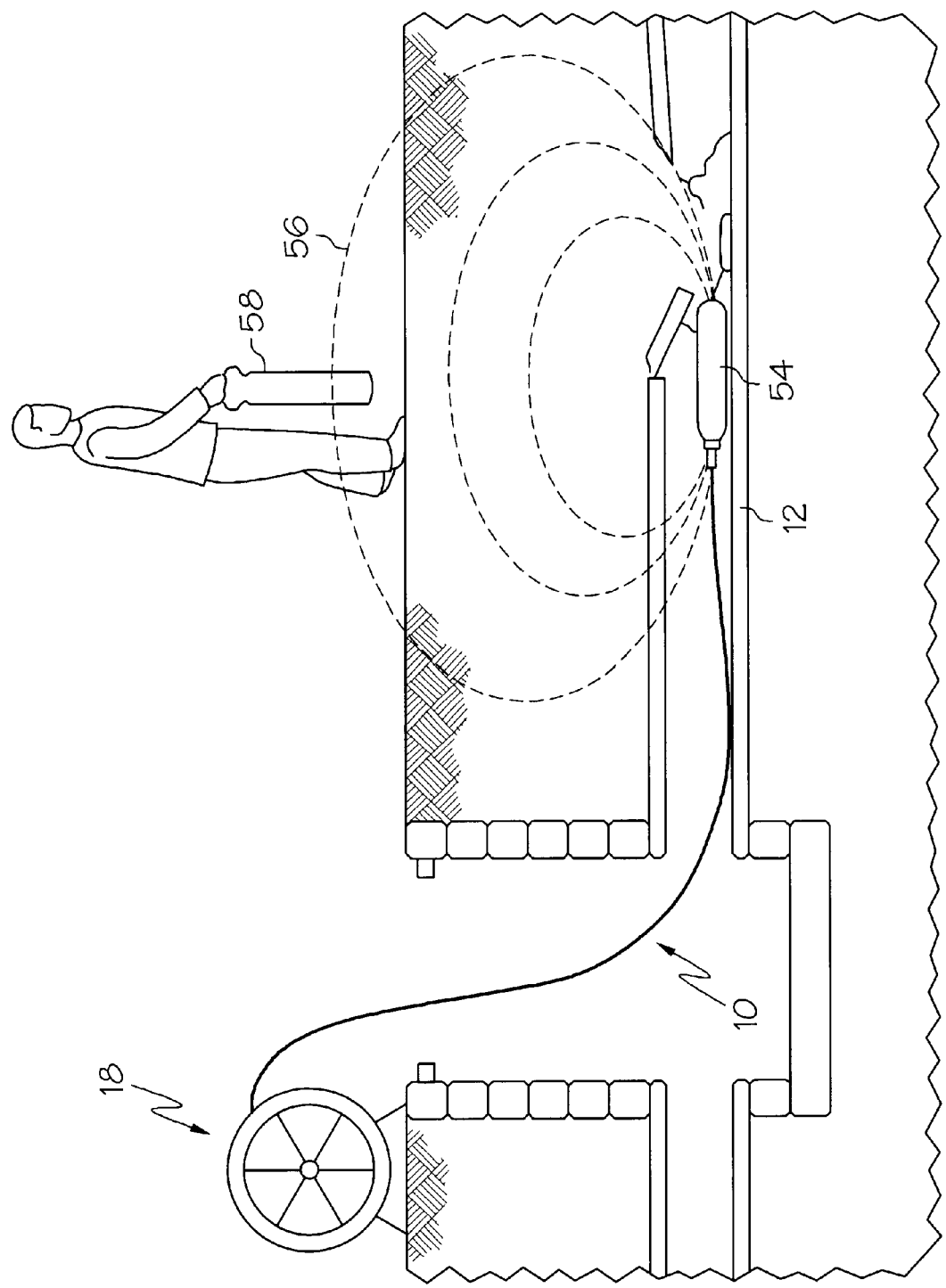
FIG. 5 is a side view illustration of a typical sonde as well as a graphical representation of the signal emitted from the sonde when the sonde is energized such as may also be seen in FIG. 2.

As may be best be seen in FIG. 4 the electromagnetic signature 44 of push rod 10 is emitted in a radial direction from the core 42. However, as may be best seen in FIG. 5, when the sonde 54 is energized the signal emitted will be from end-to-end such as indicated by signal lines 56. In addition, the signal emitted from the sonde 54 is preferably acoustic in nature and is emitted at a predetermined frequency which may be detected by detector 58 as shown in FIG. 5. The different character and frequency of the sonde's signal 56 provides for the unique ability to separately detect the position of the sonde 54 as well as that of the push rod 10. Preferably, the detector 46 for detecting the push rod signal as seen in FIG. 4, and the detector 58 for detecting the sonde signal 56, as seen in FIG. 5 may be combined in the single combination detector 60 shown in FIGS. 1 and 3.

Figure 6:
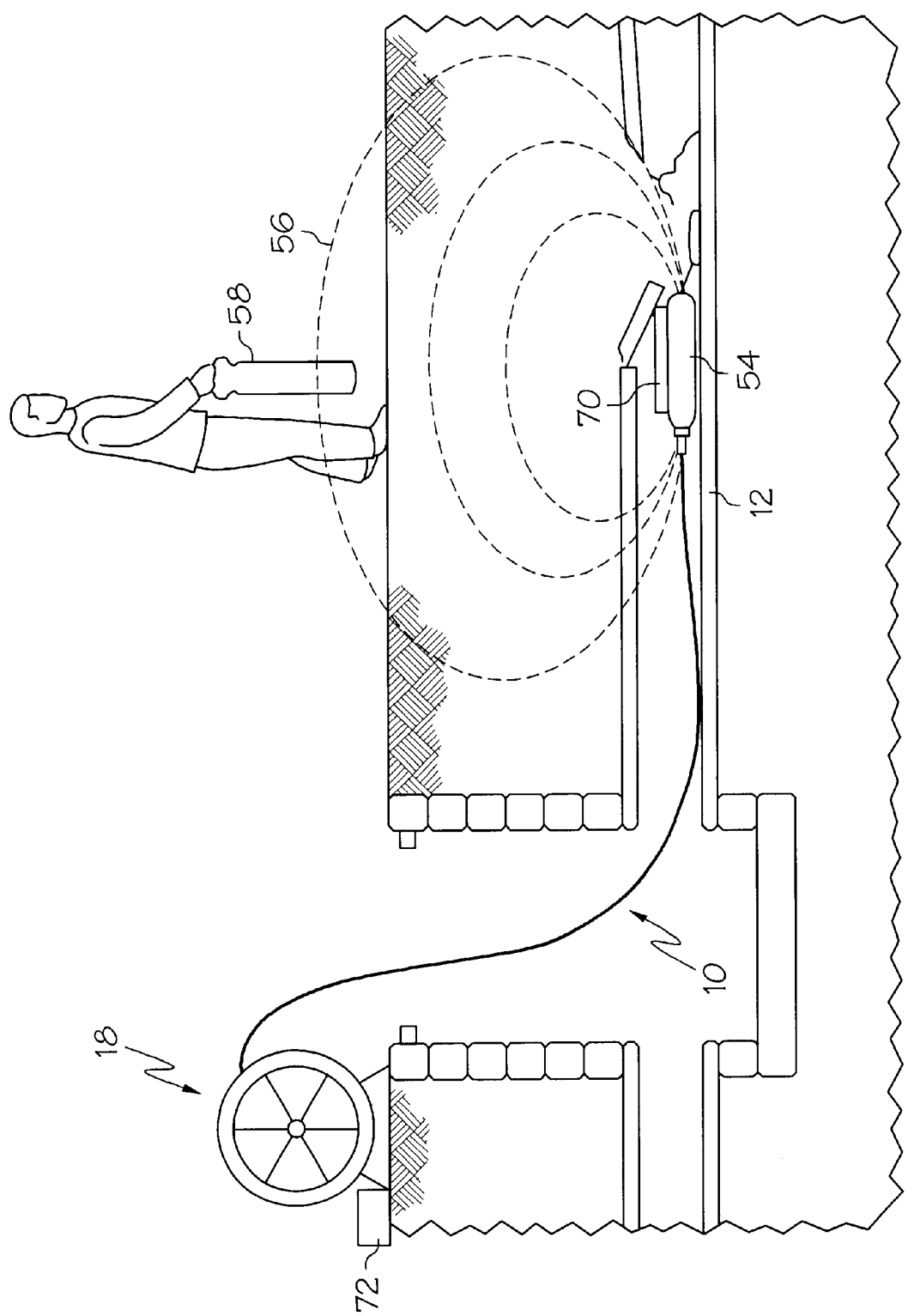
FIG. 6 is a side view of an embodiment of the present invention.

In another embodiment of the present invention as shown in FIG. 6, a camera 70 may by mounted to the incorporated onto the free end 14 of the push rod 10.

The camera may be used simultaneously with the sonde 54, or the camera 70 may be mounted in place of the sonde 54. The camera 70 is capable of transmitting a real-time image to a monitor 72 located on or near the carrier 18. The camera may be independently powered such as through self contained batteries, or the camera 70 may be supplied power by the push rod 10 through core 42 and terminal 52. When in use the camera 70 is emits an electric signal which is received by the monitor 72, thereby providing a user with the ability to manipulate the rod as necessitated by the image transmitted from the free end of the rod. Alternatively the camera 70 may be equipped with its own transmission line such as a fiber optic line or otherwise.

In addition to being directed to the embodiments described above and claimed below, the present invention is further directed to embodiments having different combinations of the features described above and claimed below. As such, the invention is also directed to other embodiments having any other possible combination of the dependent features claimed below.

The above examples and disclosure are intended to be illustrative and not exhaustive. These examples and description will suggest many variations and alternatives to one of ordinary skill in this art. All these alternatives and variations are intended to be included within the scope of the attached claims. Those familiar with the art may recognize other equivalents to the specific embodiments described herein which equivalents are also intended to be encompassed by the claims attached hereto.

What is claimed is:

1. A traceable push rod for insertion and advancement into a conduit and having a predetermined length comprising:
    an inner layer, an intermediate layer and an outer layer, the inner layer characterized as being electrically conductive, the intermediate layer characterized as being electrically insulative, the outer layer characterized as being water proof;
    a first end and a second end, the first end having at least one sonde receiving terminal, the second end adapted for communication with a power source, the power source adapted to provide an electric current to the inner layer, the inner layer constructed and arranged to emit an electromagnetic signature that is readable and detectable by a first detector when said inner layer is exposed to the electric current;
    a sonde wherein a portion of the sonde is adapted for receipt onto the sonde receiving terminal, the sonde constructed and arranged to emit a sonde signal detectable with a second detector;
    a first detector adapted to detect and read an electromagnetic signature;
    a second detector adapted to detect and read a sonde signal.

2. The traceable push rod of claim 1, wherein the conduit is electrically conductive.

3. The traceable push rod of claim 1, wherein the conduit has an electrically conductive fluid therein.

4. The traceable push rod of claim 1 wherein the inner layer is selected from at least one member of the group essentially consisting of: copper, steel, iron, silver, gold, aluminum and any combinations or alloys thereof.

5. The traceable push rod of claim 1 wherein the intermediate layer is fiberglass.

6. The traceable push rod of claim 1 wherein the outer layer is plastic.

7. The traceable push rod of claim 1 wherein the sonde signal further comprises an acoustic signal, the acoustic signal having a predetermined frequency.

8. The traceable push rod of claim 1 wherein the first detector and the second detector are housed in a single combination detector device.

9. The traceable push rod of claim 1 wherein the power source is a transmitter, the transmitter constructed and arranged to provide the electric current with a predetermined frequency.

10. The traceable push rod of claim 1, wherein the push rod is further characterized as being flexible.

11. The traceable push rod of claim 1 further comprising a carrier, the push rod removably retained about a portion of the carrier.

12. The traceable push rod of claim 11 wherein at least a portion of the push rod is in electronic communication with the carrier.

13. The traceable push rod of claim 12 wherein the power source has a first lead and a second lead, the first lead in electronic communication with a portion of the carrier in electronic communication with the push rod, the second lead adapted to be grounded.

14. The traceable push rod of claim 13 wherein the power source is removably engaged to the carrier.

15. The traceable push rod of claim 14 wherein the portion of the carrier comprises a cradle axially mounted to a frame, the cradle adapted for rotational movement in a first direction and a second direction, the push rod being fed out from the cradle when the cradle is rotated in the first direction, the push rod being drawn to and about the cradle when the cradle is rotated in the second direction.

16. The traceable push rod of claim 15 further comprising a motor, the motor constructed and arranged to provide a mechanical means for selectively stopping the cradle and rotating the cradle in the first direction and the second direction.

17. The traceable push rod of claim 16 further comprising a counter, the counter in communication with the cradle, the counter having a readout, the readout displaying the length of the push rod fed out from the carrier.

18. The traceable push rod of claim 17 wherein the counter is electronic.

19. The traceable push rod of claim 12 further comprising a camera and a monitor, the camera constructed and arranged to engage the first end of the push rod, the monitor in electronic communication with the push rod, the camera in electronic communication with the monitor.

20. A method for tracing a conduit using the trace rod of claim 15 comprising:
    inserting the first end of the push rod into a conduit opening;
    advancing the push rod a predetermined distance into the conduit by rotating the axially mounted cradle in the first direction;
    connecting the first lead of the power source to a portion of the carrier which is in electronic communication with a portion of the push rod and grounding the second lead;
    providing the inner layer of the push rod with electronic current;
    detecting the electromagnetic signature of the push rod with the detector.

21. The method of claim 20 wherein the conduit is electrically conductive.

22. The method of claim 20 wherein the conduit includes an electrically conductive fluid therein.

23. The method of tracing a conduit of claim 20 further comprising:
    providing the second end of the push rod with a sonde, the sonde adapted for receipt onto the sonde receiving terminal, the sonde constructed and arranged to emit a sonde signal when the inner layer is provided the electric current, the sonde signal characterized as being different from the electromagnetic signal of the push rod, the sonde signal being detectable with a second detector
    providing the sonde with electronic current;
    detecting the sonde signal.

24. The method of tracing a conduit of claim 23 wherein the first detector and the second detector are contained in a single combination detector device.

* * * * *